United States Patent
French

[11] 4,029,391
[45] June 14, 1977

[54] LIGHT PROBE AND INTERFACE THEREFOR

[75] Inventor: Park French, Aurora, Ohio

[73] Assignee: Sterndent Corporation, Mount Vernon, N.Y.

[22] Filed: Jan. 8, 1976

[21] Appl. No.: 647,365

Related U.S. Application Data

[63] Continuation-in-part of Ser. No. 499,491, Aug. 22, 1974, Pat. No. 3,947,088.

[52] U.S. Cl. .............................. 350/96 C; 250/227; 350/96 R; 356/188
[51] Int. Cl.² ............................................. G02B 5/14
[58] Field of Search .................. 350/91, 96 R, 96 B, 350/96 BC, 96 C, 179; 128/2 L, 2 M, 4, 6; 250/227; 356/30, 41, 173, 176, 177, 186, 188, 189, 201, 209, 210, 211, 212

[56] References Cited
UNITED STATES PATENTS

| | | | |
|---|---|---|---|
| 1,891,348 | 12/1932 | Ellinger et al. | 350/91 |
| 2,415,211 | 2/1947 | Law | 350/179 |
| 3,449,036 | 6/1969 | Jacobsen | 350/96 BC |
| 3,461,856 | 8/1969 | Polanyi | 350/96 B |
| 3,463,595 | 8/1969 | Blanc et al. | 356/201 |
| 3,497,562 | 2/1970 | Levins | 350/179 X |
| 3,529,896 | 9/1970 | Padawer | 356/181 |
| 3,643,653 | 2/1972 | Takahashi et al. | 350/96 BC X |
| 3,947,088 | 3/1976 | French | 350/96 C |

*Primary Examiner*—Edward S. Bauer
*Assistant Examiner*—F. L Evans
*Attorney, Agent, or Firm*—Donnelly, Maky, Renner & Otto

[57] ABSTRACT

A relatively viscous light transmissive liquid material, such as glycerine or the like, applied to the solid end portion of a light conducting member enhances the optical coupling with a sample or object having an irregular and/or glossy surface to be optically examined. Moreover, the light probe system has a test end with a tip for substantial abutment with a test area or test point of a sample. The tip provides point or primary illumination of the test point and a further source of general or secondary illumination is provided the sample annularly about the probe tip and test point so that upon illumination of the sample ambient lighting effects are simulated.

23 Claims, 5 Drawing Figures

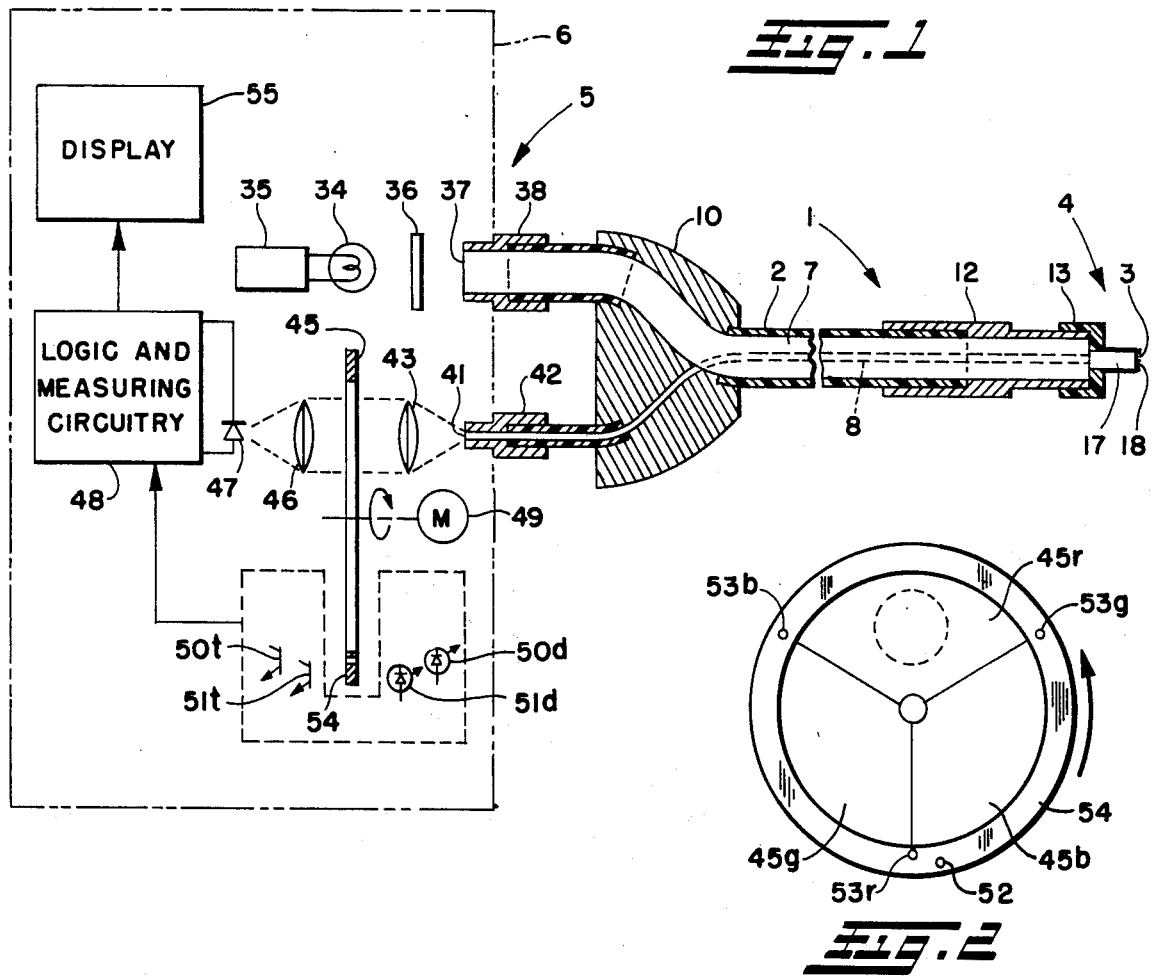
Fig. 1
Fig. 2
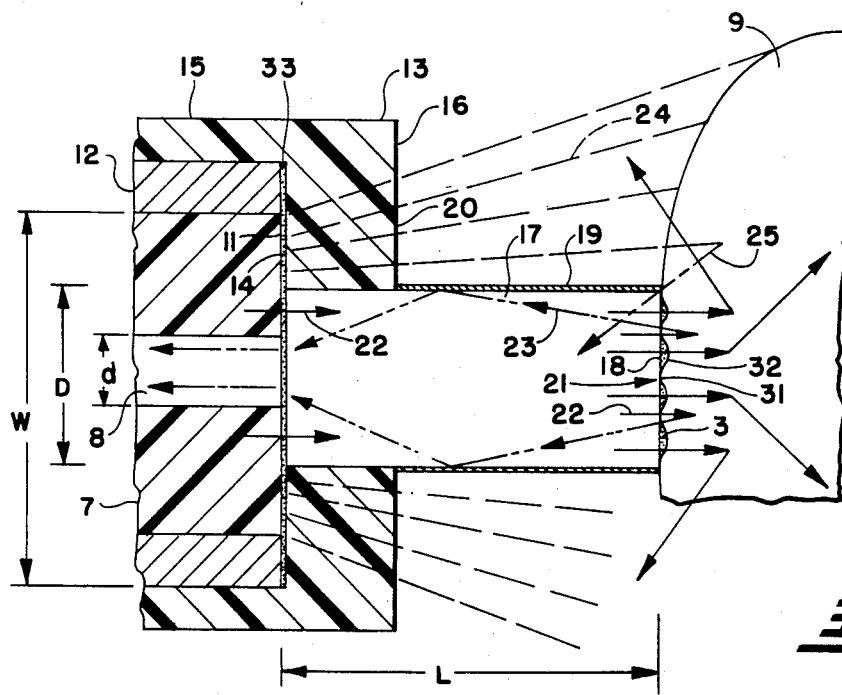
Fig. 3

LIGHT PROBE AND INTERFACE THEREFOR

BACKGROUND OF THE INVENTION

This application is a continuation-in-part of U.S. Pat. application Ser. No. 499,491, filed Aug. 22, 1974, for "Interface for Light Probe" now U.S. Pat. No. 3,947,088. Both applications are commonly assigned. This invention relates to a light probe or the like for point and general illumination of a sample or object, e.g. teeth in the mouth of a patient, to be optically examined so as to simulate ambient lighting effects and to a liquid interface for enhancing the optical coupling characteristics for such light probe or the like.

The instant invention provides for a reduction and/or elimination of undesirable specular reflection of light from a sample undergoing optical testing. Such optical testing may be in the form of color, density, opacity or the like measurements, and the invention will be described below particularly with relation to a tristimulus type colorimeter disclosed in U.S. Pat. application Ser. No. 499,479, filed Aug. 22, 1974, now U.S. Pat. No. 3,986,777 for "Tristimulus Colorimeter and Method of Using the Same for Fabrication of Artificial Teeth or the Like," which application is assigned to the same assignee as the present application. The following description is by way of example, however, and it is to be understood that the invention may be used in virtually any optical testing instrument or light probe device to enhance optical coupling between a light conducting member and a sample, to reduce specular reflection from a glossy sample, and/orto provide both point and general illumination of a sample.

The prior art is replete with various types of light conducting members, such as solid or hollow light conducting rods, fiber optic bundles and the like, for directing incident light to a sample and/or for receiving light reflected from a sample. In the present application the word "sample" refers to an object being optically examined, whether it be an unknown object, a reference object having known optical characteristics, or the like.

One disadvantage with many prior art optical examination devices employing light conducting members is the undesirable specular reflection of light caused at the interface of the member and a relatively clear, glossy surface of a sample, such as a tooth, having a property of color, opacity or the like, which is to be measured. Moreover, undesirable refraction and/or scattering of light may occur at an imperfect interface between a directly abutting light conducting member and sample, which may cause inaccuracies in optical measurements of the sample. Such an imperfect interface may be encountered, in particular, when the substantially smooth solid end or tip of a light probe is placed to abutment with the relatively undulating surface of a tooth. Also, although optimum optical coupling is effected by holding a light probe exactly normal to the sample, different operators or technicians may hold the light probe at different relative angles to the sample and therefore obtain different measurements of that sample.

It is desirable that the color or the like measurements of teeth be indicative of the color of each tooth as viewed naturally by the eye of an observer under typical ambient light conditions. To make such measurements the illuminating light usually must have a higher intensity than typical ambient light intensity, and when the tooth color is being measured, for example, for the purpose of subsequent replacement by an artificial tooth the size of each test point examined on the tooth should be of small area so that many measurements, say nine or more, can be made to establish a color gradient for the tooth. However, a source of error may be encountered when measuring such small test point areas due to the non-uniform translucency of teeth, for example, which may cause different amounts of the incident light illuminating those respective points to scatter away from a light probe pick-up, thus adversely affecting the accuracy of the measurements.

SUMMARY OF THE INVENTION

In the instant invention the solid end portion of a light conducting member, which directs light to and/or receives reflected light from a sample being optically examined, is provided with a quantity of clear viscous light transmissive liquid or liquid-like material, such as glycerine or the like, which material has an index of refraction of approximately the same magnitude as the member and sample. That liquid interface enhances optical coupling between the light conducting member and the sample, even if one or both of the latter are imperfectly formed, e.g. having a somewhat undulating surface like a tooth, or improperly aligned, i.e. not normal, to permit accurate optical measurements of the sample.

Moreover, in the present invention the effects of ambient illumination are simulated in illuminating the sample. More specifically, primary uniform incident illumination is provided the test point of finite area of a sample being optically examined via a specific direct light conductive path, which includes the solid end of a light probe, and secondary illumination is provided the sample annularly about the testpoint. The incident secondary illumination intensity immediately adjacent and surrounding the test point preferably equals the intensity of the primary illumination at the test point and the secondary illumination intensity may remain uniform or fall off relatively gradually in a direction radially from the test point.

Also, the light probe of the present invention is provided with an end cap that is removable for sterilization after use with one dental patient for subsequent use with another or for throw-away after one use and replacement by another similar sterile end cap. The end cap includes the light probe tip for the primary illumination and a light conductive path outlet for the secondary illumination, and a liquid interface may be utilized also between the end cap and the major light conductive extent of the light probe to enhance the optical coupling therebetween.

Accordingly, it is a primary object of this invention to increase the accuracy of optical measurements.

Another object is to reduce and/or to eliminate specular reflection at the interface of a light probe and a sample.

An additional object is to provide a liquid extension of a solid light pipe.

A futher object is to reduce the variability in optical measurements caused, for example, by a misaligned light probe and sample.

Yet another object is to reduce and/or to eliminate scattering and refraction at the interface of a light probe and a sample.

Yet an additional object is to simulate natural lighting effects on a tooth or other sample being optically examined.

Yet a further object is to provide a removable light transmissive end cap for a light probe system.

These and other objects and advantages of the present invention will become more apparent as the following description proceeds.

To the accomplishment of the foregoing and related ends, the invention, then, comprises the feature hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a side elevation view, partly in section, of a light probe and interface in accordance with the invention coupled to a tristimulus colorimeter;

FIG. 2 is a plan view of the color filter wheel of the colorimeter of FIG. 1;

FIG. 3 is an enlarged partial side elevation view partly in section, of the light probe test end and liquid interface of the invention in operative position with a translucent sample;

DESCRIPTION OF THE PREFERRED EMBODIMENTS

Figure 4:
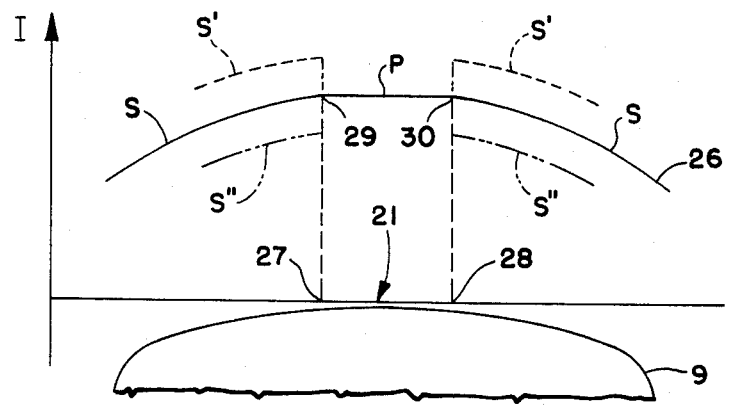
FIG. 4 is a graph depicting the intensity of the incident light over the surface of the sample of FIG. 3.

Referring now more specifically to the drawings, wherein like reference numerals designate like parts in the several Figures, and initially to FIGS. 1, 2 and 3, the light probe instrument in accordance with the invention is generally designated at 1, including an elongate, major light conductive portion 2. The light probe 1 has a quantity of light transmissive, liquid-like interface material 3 applied to the test end 4 thereof and is coupled at its other end 5 to a tristimulus colorimeter 6, which is described in greater detail in the above referenced Pat. application Ser. No. 499,479. It is, of course, to be understood that the light probe and liquid interface of the present invention may be utilized with optical measuring systems other than the colorimeter 6 as will be evident from the description herein.

The portion 2 of the light probe 1 includes a pair of light conductive members 7, 8, the former serving as a conductor of incident light for illumination of a sample 9, shown in FIG. 3, and the latter serving as a conductor of reflected light from the sample back to the colorimeter 6 for measurement thereof and both may be covered for protection and to avoid ambient influences by a conventional plastic or rubber cover or sheath. Preferably the two light conductive members 7, 8 are cylindrical, and the former has a hollow portion within which a length of the latter is concentrically positioned from the conventional junction 10 to the planar end face 11 thereof at the test end 4, thus forming a bifurcated light conducting device, which may be solid, hollow, fibrous, or the like. Also, the test probe portion 2 is preferably relatively flexible to facilitate positioning of the test end to abutment with a sample 9, such as a tooth in the mouth of a dental patient.

Surrounding the concentric light conductive members 7, 8 at the test end 4 is a metal or plastic housing cover 12, which may easily be cleaned or sterilized, for manual grasping of the light probe 1, and an end cap 13 is placed over the cover and with a planar surface 14 substantially abutting the planar end face 11 of the light conductive members 7, 8. The end cap 13 includes a holder comprising a cylindrical mounting portion or collar 15, which fits over the cover 12, and a relatively flat, annular, light transmissive disc 16 that support a cylindrical, relatively elongate light probe tip 17, which has a solid end face 18 intended to abut the sample 9, as is illustrated in FIG. 3. The light probe tip 17 may be secured in a bore in the disc 16, as shown, although, if desired, the tip and disc may be formed as an integral part, and at least the tip and disc of the end cap 13 are light transmissive, such as, for example, clear plastic, glass or the like. Also, the tip 17 is preferably internally reflective to diffuse primary incident light traveling therethrough and to assure that reflected light from the sample 9 picked up at the solid end face will not be transmitted through that longitudinal surface and lost to the ambient surroundings. Therefore, a light reflective coating 19 on the longitudinal outer surface of the light probe tip 17 from the face 20 of the disc 16 to the solid end face 18 may be provided for this purpose.

When the end cap 13 is placed over the end of the light probe, the longitudinal axis of the light probe tip 17 is preferably co-linear with the common longitudinal axis of the light conductive members 7, 8, and the diameter and cross-sectional area of the light probe tip 17 at the confronting surfaces 11, 14 is larger than the diameter and cross-sectional area of the light conductive member 8. Therefore, incident light from the colorimeter 6 may be transmitted through the outer light conductive member 7, and a portion of that incident light will pass from that light conductive member into the light probe tip 17 to provide primary illumination of the test point or test area 21 of the tooth 9 being optically examined. The optical characteristics of the light probe tip 17, which is preferably transparent, assures that the primary illumination which is designated by the solid arrows 22 is substantially completely uniform over the entire surface area of the test point 21. Of the primary illumination 22 entering the tooth 9, a quantity, which is schematically illustrated by the phantom arrows 23, is reflected back from the tooth and is picked up by the light probe tip 17. This reflected light 23, which includes color or other optical information of the tooth 9, is directed back through the light probe tip toward the confronting surfaces 11, 14, where a portion of that reflected light enters the light conductive member 8 for transmission to the measuring portion of the colorimeter 6.

Another portion of the incident primary light 22, however, will tend to scatter in the tooth 9 away from the test point 21 or may be transmitted completely through the tooth, and in either event that portion of the incident primary light will not be reflected back for pick up by the light probe tip 17. Moreover, the fraction of the primary incident light that is so lost in the tooth 9 will vary from one test point 21 to another test point, depending on the particular translucency of the tooth at each test point, which may cause the degree of inaccuracy in the color measurement to be different for each test point over the entire surface area of the tooth.

By also illuminating the tooth 9 with secondary illumination, which is indicated by the dashed lines 24 in FIG. 3, those inaccuracies can be appreciably reduced or eliminated. This result may be accomplished by equating the intensity of the primary illumination 22 and the intensity of the secondary illumination 24 immediately outside the probe tip adjacent the test point 21, and with the secondary intensity being substantially uniform, i.e. not varying sharply, ambient lighting effects may be simulated, whereby the quantity of the light scattering into and scattering out of the view of the solid end face 18 of the light probe tip 17 will be substantially equalized. The secondary illumination 24 also emanates from the light conductive member 7 and passes therefrom through the light transmissive disc 16 of the end cap 13 through the surrounding air to the tooth. A portion indicated by the phantom arrow 25 in FIG. 3 of the secondary illumination light 24 will reflect back to the test point 21 and, thus, into the light probe tip 17 for pick up thereby and subsequent measurement by the colorimeter 6.

Since the secondary illumination 24 is not confined after it leaves the light conductive member 7, the intensity thereof actually illuminating the test point 21 will vary according to the inverse square law. Therefore, to examine the test point 21 when under substantially uniform lighting conditions that simulate the effect of ambient lighting so that the tooth appears to the colorimeter as it would when naturally viewed by the eye of an observer, whereby the secondary illumination scattered in the tooth to the test point 21 about equals the primary illumination scattered away, the intensity of the primary illumination 22 and the intensity of the secondary illumination 24 should be about equal at least at the test point 21 and at the external periphery thereof adjacent the light probe tip 17 and the secondary illumination should be substantially uniform or, at least, should not vary sharply.

Assuming, for example, that the light probe tip 17 has a length L, which is also the approximate distance from the planar end face 11 of the light conductive member 7 to the surface of the tooth 9, that the light probe tip 17 has a diameter D, that the light conductive member 7 has a total diameter W and that the light conductive member 8 has a diameter $d$, by maintaining the diameter $d$ and D fixed and by enlarging the diameter W and the length L, the uniformity of the secondary illumination 24 over the surface of the tooth 9 will increase. Moreover, assuming, for example, that the dimensions L and W are fixed at respective magnitudes to examine a number, say nine, separate test points on the tooth of an adult dental patient, by varying the ratio of the dimensions D and $d$, the equality of the primary illumination intensity and the secondary illumination intensity just outside the light probe tip 17 can be maintained. It is evident that to measure or otherwise optically examine a sample having a relatively sharp surface curvature, the dimension D should be relatively smaller than when measuring a large, quite flat sample.

Turning now briefly to FIG. 4, a graph of the curve of the light intensity magnitude I at the surface of the same planar section through the tooth 9, as illustrated in FIG. 3, is designated at 26. Between the locations 27, 28 on the abscissa, beneath which is located test point 21 of the tooth 9, the intensity due to the primary illumination 22 is at a constant relatively maximum level, as is designated at a portion of the curve P. On both sides of the curve portion P are downwardly sloped curve portions S representing intensity at the tooth due to the secondary illumination 24. Since the intensity of the secondary illumination is substantially uniform or, at least, does not vary very much over the illuminated tooth surface and since the intensity of the secondary illumination and that of the primary illumination are the same at their meeting points 29, 30 on the graph just inside and just outside the longitudinal sidewalls of the light probe tip 17 at the test point 21, it is clear that the L, D, W and $d$ parameters were suitably selected to simulate the effect of ambient lighting. If the intensity of the secondary illumination were too high, then the intensity curve of FIG. 4 would follow the dashed line S' or if the secondary illumination intensity were too low, the graph of FIG. 4 would follow the curve S" outside the area of primary illumination P between the points 27, 28. In either of the latter two situations, wherein the graph of FIG. 4 would have a step at the juncture of the primary and secondary illumination, the effect of ambient lighting would not be simulated and too much or too little secondary light may be scattered to the test point area for pick up by the light probe tip 17.

A quantity of liquid-like interface material 3 preferably is placed between the solid end face 18 of the light probe tip 17 and the test point 21 of the sample, such as a tooth 9, to which the solid end face 18 is intended to be brought to abutment for optical measurement. The material 3 preferably has an index of refraction approximately equal to either or between the index of refraction of the light probe tip 17 and the index of refraction of the first-encountered material at the surface of the sample 9, such as, for example, the index of refraction of the surface of a tooth. The material 3, while being liquid-like, is relatively viscous, as compared, for example, to wetted water, and, therefore, tends to resist rapid flowing; it also may be syrupy or jelly-like and tends to form a complete integral coating on a surface to which it may be applied. Therefore, when applying the material 3, for example, to the solid end face 18 of the light probe tip 17 by simply dipping the latter into a quantity of the material 3, a suitable quantity of the material 3 will remain on the solid end face 18 coating the same for a sufficiently long period to allow a technician to place the latter to abutment with a sample. It has been found that a suitable interface material 3 is glycerine, for glycerine is a relatively viscous material that tends to flow relatively slowly and that provides a good coating of the solid end face 18, is relatively clear, is non-toxic, and has an index of refraction suitable to the purpose. Of course, it is contemplated that other interface materials having similar properties may be utilized.

After having applied a quantity of the liquid interface material 3 preferably to the solid end face 18, or equivalently to the test point 21 of the tooth 9 or other sample to be examined, the test end 4 of the light probe 1 may be brought toward the sample 9, as is illustrated in FIG. 3. The solid end face 18 of the light probe tip 17 is brought to substantially flat abutment with the surface of the sample; and although it is preferred that as much of the solid end face 18 as possible actually be in direct abutment with the sample surface, the liquid interface 3 will tend to provide an optical extension of the light probe tip 17 wherever the solid end face is not in such direct abutment. Usually the solid end face will directly abut some or all of the peaks 31 of the tooth surface, which are shown exaggerated in FIG. 3, and the interface material 3 will fill in the valleys 32 or other areas that the face 18 is not directly abutting the test point 21 so that the surface reflection and/or refraction that might otherwise occur and adversely effect the optical measurements are reduced or eliminated. Accordingly, even if the surface of the sample 9 is not very flat or if the light probe tip 17 is not placed exactly normal to the surface at the test point 21, relatively accurate optical measurements of the sample may be made.

As is described herein, the light probe 1 of the present invention is particularly suitable for use with a colorimeter to obtain quantitative measurements of the color of teeth in the mouth of a dental patient, and the light probe 1 is all the more suitable to that purpose because the end cap 13 may be removable from the end of the light probe, for example, for sterilization of the end cap after use with one patient and for subsequent replacement of the sterilized end cap on the light probe for use with another patient. Alternatively, depending on the cost of the end cap 13, it may be a throw-away item, whereby after use with one patient, the end cap 13 may be discarded, and a new sterile end cap placed on the end of the light probe 1 to ready the same for use with another patient. Also, the end cap 13 may be provided in several different sizes with different respective length dimensions L and diameter dimensions D of the light probe tip 17 so as to provide for geometric adjustment of the relationships between the primary and secondary illumination, the uniformity of the latter, and the size of each individual test point 21 capable of optical examination at any one time. If desired, a quantity 33 of liquid interface material, which may be glycerine or other material having properties similar to those described above with reference to the liquid interface material 3, may be placed between the two confronting surfaces 11 and 14 of the light conductive members 7, 8 and the end cap 13 further to enhance the optical coupling therebetween in the manner described above with reference to the liquid interface material 3. Moreover, the reflective coating 19 should be sufficiently thin that it does not cause a step in the illumination curve 26 at the points 29, 30, and may be, for example, an aluminized coating over the longitudinal surface of the light probe tip 17. The exterior of the reflective coating 19 may be blackened or made otherwise non-reflective to avoid concentration of the secondary illumination 24 peripherally about the test point 21.

Referring back now to FIGS. 1 and 2, in the colorimeter 6 a lamp 34, which is energized from a regulated power supply 35 to produce a light output of a constant color temperature, provides that light via a heat absorbing or infrared filter 36 to the incident light input end 37 of the light conductive member 7, which is coupled to the colorimeter 6 via a conventional metal or other relatively rigid material termination 38. If desired, an adjustable aperture or the like, not shown, may be provided between the lamp 34 and the input end 37 for adjustment of the incident illumination intensity.

The output end 41 of the light conductive member 8 is connected to the colorimeter 6 by another conventional termination 42 to direct reflected light to a lens 43, which substantially collimates the reflected light and directs the same along a light path 44 to a rotating color filter wheel 45. The color filter wheel 45 is also illustrated in FIG. 2. Light transmitted through the color filter wheel is focused by a further lens 46 onto a measuring photosensitive diode 47, and the signal from the photosensitive diode is provided to a logic and measuring circuitry arrangement 48 which is synchronized to the rotating color wheel 45. More particularly, as a motor 49 rotates the color filter wheel, which includes, for example, red, blue and green color filters, 45r, 45b, 45g, as shown in FIG. 2, light emitted by respective light emitting diodes 50d, 51d is occassionally transmitted through respective rotation synchronizing opening 52 and filter alignment openings 53r, 53b, 53g in an opaque annular ring 54 on the color filter wheel for energizing respective photosensitive transistors 50t, 51t, as is described in more detail in the above referenced patent application. The logic and measuring circuitry 48 provides electrical signals to a display device 55, which upon operation of the colorimeter to measure red, blue and green optical properties of the sample, displays values indicative of such properties, for example, on respective light emitting diode displays, not shown.

Accordingly, when using the light probe 1 and colorimeter 6 to measure the color characteristics of a tooth 9, for example, a dentist or technician may place a sterile end cap 13 in place on the light probe, dip the solid end face 18 of the light probe tip 17 into a quantity of glycerine or the like, while holding the cover 12, and then place the solid end face 18 to substantial abutment with the sample, whereupon effective optical coupling with the sample will be achieved and the colorimeter will automatically measure the respective red, blue and green color characteristics thereof.

Figure 5:
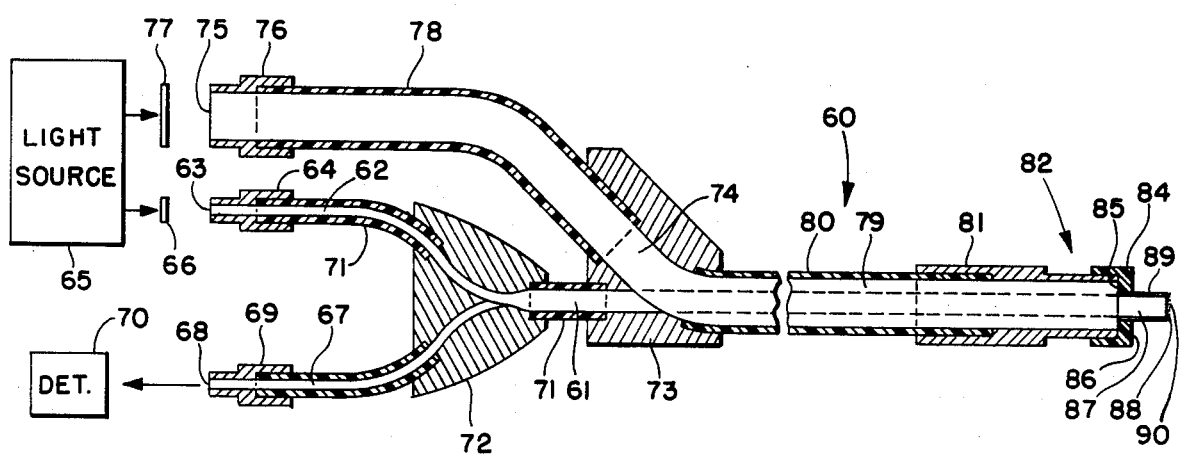
FIG. 5 is a side elevation view, partly in section, of another embodiment of the light probe in accordance with the invention.

Referring now more particularly to FIG. 5, a modified form of light probe is generally indicated at 60. The light probe 60 includes a first light conductive member as a bifurcated light conductive bundle 61 having an incident illumination transmitting light conductive member 62 with an input end 63 aligned by a conventional termination 64 to receive incident light from a light source 65 via an adjustable aperture or the like 66 and a reflected light transmitting light conductive member 67 having an output end 68 aligned by another termination 69 to direct reflected light from a sample to a detector 70. The two light conductive members 62, 67 which are covered by a plastic coating or sheath or the like 71 for protection and to avoid exposure to ambient, are joined in a conventional junction device 72 as a random fiber optic light conductive bundle 61, and the latter is then joined at another junction 73 with the secondary illumination transmitting light conductive member 74, which has its light input end 75 aligned by a termination 76 to receive light from the light source 65 via another adjustable aperture 77. The apertures 66 and 77 may be connected for simultaneous adjustment or for independent adjustment or, if desired, the apertures 66 and 77 may be fixed and the respective ends 63, 75 of the light conductive members 62, 74 may be relatively movable with respect to the apertures to adjust the quantity of light received by them. The light conductive member 74 also is preferably covered by a plastic coating or sheath 78.

The flexible length 79 of the light probe 60, wherein the light conductive members 61, 74 are concentrically aligned, has a protective covering 80 and is terminated by a metal, plastic or the like housing cover 81 at the test end 82.

The cover 81 and the light conductive portions therewithin preferably terminate in a flat face for abutment with an opposing flat face of the end cap 84 at a juncture 85, separated by a liquid interface, as at 33 in FIG. 3, if desired. The end cap 84 is similar to the end cap 13 discussed above with reference to FIGS. 1 and 3 and, accordingly, has a holder portion with a light transmissive annular disc 86 and a relatively elongated, light transmissive light probe tip 87 that terminates in a solid end face 88 intended to abut with the surface of a sample to be optically examined. However, in the end cap 84 the reflective coating 89 extends along the entire length of the light probe tip 87 to prevent entry of the secondary illumination into the light probe tip and to prevent reflected light from the sample from being lost without pick-up by the light conductive member 67 of the bundle 61; and this full longitudinal extent of the non-reflective coating may be included in the end cap 13 of FIGS. 1 and 3. Moreover, the diameter dimension D of the light probe tip 87 and the diameter dimension d of the light conductive bundle 61 preferably are the same so that all of the primary incident light directed along the light conductive member 62 will be transmitted through the light probe tip to illuminate the sample and all of the reflected light from the sample being picked up by the light probe tip will be transmitted back down the bundle 61 and into the light conductive member 67 for measurement by the detector 70.

The light probe 60 may be used in conjunction with a colorimeter, such as the colorimeter 6 described above, wherein the light source 65 and the detector 70 form a part thereof, and in so using the light probe 60 preferably a quantity of liquid interface material, such as glycerine or the like, which is indicated at 90, is placed on the solid end face 88 of the light probe tip to enhance the optical coupling between the light probe 60 and the sample in the manner described above.

In view of the foregoing, it should now be clear that the invention enhances the optical coupling between a light probe and a sample, substantially simulates the effect of ambient lighting of a sample while measuring the same with light of relatively higher intensity than ambient light, and facilitates maintaining sterile conditions when utilizing the light probe in dental and/or medical procedures.

The embodiments of the invention in which an exclusive property or privilege is claimed are defined as follows:

1. An end cap for a light probe for directly and indirectly optically coupling such light probe and a sample, comprising light conductive means having a first end positionable in substantial abutment with such light probe and a second end positionable in substantial abutment with such sample for conducting substantially all the light received at one end directly to the other end and thus substantially directly optically coupling such light probe and sample, and
support means generally annularly about said light conductive means for holding said first end aligned and in substantial abutment with such light probe, said support means including light transparent means positionable in alignment with such light probe for indirectly coupling light between such light probe and sample.

2. An end cap as set forth in claim 1, wherein said support means comprises collar means for receiving the end of a light probe inserted therein to abutment with said first end of said light conductive means.

3. An end cap as set forth in claim 1, wherein said light transparent means comprises a generally annular first surface substantially coplanar with said first end of said light conductive means.

4. An end cap as set forth in claim 3, wherein said light transparent means comprises a generally annular second surface spaced apart from said first surface in a direction toward said second end of said light conductive means, and wherein said second end is spaced away from said second surface, whereby the length of said light conductive means is greater than the thickness of said light transparent means.

5. An end cap as set forth in claim 4, wherein said light conductive means comprises a solid longitudinal surface extending between said first and second ends, and internally light reflective means on said longitudinal surface for preventing escape of light within said light conductive means through said longitudinal surface.

6. An end cap as set forth in claim 5, wherein said light reflective means comprises a reflective coating on said longitudinal surface and a non-reflective coating over the reflective coating to prevent said reflective coating from reflecting light between said light transparent means and such sample.

7. A light conductive system for illuminating a sample to simulate the effect of ambient lighting, comprising first light conductive means for conducting substantially uniform primary incident light to a test area of a sample in abutment therewith, and second light conductive means for directing to such sample peripherally about such test area relatively less uniform secondary light while such primary incident light is being conducted to such sample, whereby such illumination of such sample simulates the generally uniform illumination effect of ambient lighting of such sample.

8. A light conductive system as set forth in claim 7, wherein said first light conductive means comprises a solid end face portion positionable to abutment with such sample, and said second light conductive means comprises a light transmitting face means positioned remotely from such sample relative to said solid end face when the latter is in abutment with such sample for directing such secondary light toward such sample generally in the same direction as such primary light, and said first and second light conductive means being related such that the intensity of such secondary incident light immediately adjacent said first end at such sample is a maximum and substantially equal to the intensity of such primary light.

9. A light conductive system as set forth in claim 7, further comprising reflected light receiving means for directing reflected light from such an illuminated sample to a location away from such sample for optical examination thereof.

10. A light conductive system as set forth in claim 9, wherein said first light conductive means comprises an elongate, generally cylindrical, flexible, first light pipe having an input end positionable with respect to a light source to receive an incident light input therefrom and an output end forming a light output therefor, said first light pipe having a hollow interior portion, said reflected light receiving means comprising a second light pipe in said hollow interior portion of said first light pipe and having an input end to receive reflected light from such illuminated sample and an output end extending outside said first light pipe for positioning to direct such received reflected light to an optical examination device.

11. A light conductive system as set forth in claim 10, wherein said output end of said first light pipe and said input end of said second light pipe are coplanar, and said first light conductive means further comprises an elongate light conductive tip having opposite end faces, one of said end faces being positionable in abutment with a sample, and the other of said end faces being aligned with both coplanar ends of said first and second light pipes, whereby said light conductive tip conducts primary incident light from said first light pipe directly to such sample in abutment therewith and conducts reflected light from such sample to said second light pipe.

12. A light conductive system as set forth in claim 11, wherein said second light conductive means comprises light transparent holder means generally annularly about said light conductive tip proximate said other end face thereof, relatively thinner than the elongation of said light conductive tip, and in alignment with the remainder of said output end of said first light pipe for directing secondary illumination toward such a sample while also supporting said light conductive tip in its aligned position.

13. A light conductive system as set forth in claim 12, wherein said light conductive tip and said holder means comprise a removable end cap, and further comprising light transparent liquid interface means between opposing surfaces of said end cap and said first and second light pipes for enhancing the optical coupling therebetween.

14. A light conductive system as set forth in claim 9, wherein said first light conductive means and said reflected light receiving means comprise an elongate, generally cylindrical, flexible bifurcated light pipe having first and second opposite ends, said first end being positionable with respect to a sample for primary illumination thereof and for receiving reflected light therefrom, said second end having a first part positionable to receive a primary incident light input from a light source and a second part positionable to direct such reflected light to an optical examination device.

15. A light conductive system as set forth in claim 14, wherein said second light conductive means comprises a further light pipe having a portion concentric about a portion of said bifurcated light pipe, a light input end positionable to receive a secondary incident light input from a light source and a generally annular light output end concentric with said first end of said bifurcated light pipe for directing secondary incident light toward said sample.

16. a light conductive system as set forth in claim 15, wherein said first light conductive means further comprises an elongate light conductive tip having opposite end faces, one of said end faces being positionable in abutment with a sample and the other of said end faces being aligned with both said first end of said bifurcated light pipe for directly conducting light between the latter and a sample.

17. A light conductive system as set forth in claim 16, wherein said second light conductive means further comprises light transparent holder means generally annular about said light conductive tip proximate said other end face thereof, relatively thinner than the elongation of said light conductive tip, and in alignment with said light output end of said further light pipe for directing secondary illumination toward such a sample while also supporting said light conductive tip in its aligned position.

18. A light conductive system as set forth in claim 17, wherein said first end of said bifurcated light pipe and said light output end of said further light pipe are coplanar, said light conductive tip and said light transparent holder means having respective coplanar surfaces for positioning in alignment with said respective first coplanar surface.

19. A light conductive system as set forth in claim 18, wherein said light conductive tip and said holder means comprise a removable end cap, and further comprising light transparent liquid interface means between opposing surfaces of said end cap and said coplanar surfaces of said light pipe ends for enhancing the optical coupling therebetween.

20. A light conductive system as set forth in claim 7, further comprising liquid-like interface means between said first light conductive means and such sample at the test area of the latter for optically coupling the two where they are aligned but not in direct abutment.

21. A light conductive system as set forth in claim 20, wherein said liquid-like interface means comprises a substantially clear, relatively viscous, syrupy, flow-resistant liquid.

22. A light conductive system as set forth in claim 21, wherein said liquid comprises glycerine.

23. A light conductive system as set forth in claim 20, wherein said liquid-like interface means has an index of refraction between the indices of refraction of said first light conductive means and such sample.

* * * * *